United States Patent
Decorzant et al.

(10) Patent No.: US 7,022,665 B2
(45) Date of Patent: Apr. 4, 2006

(54) ACETALS OF 2,4,7-DECATRIENAL AS PERFUMING OR FLAVORING INGREDIENTS

(75) Inventors: René Decorzant, Onex (CH); Ferdinand Naef, Carouge (CH)

(73) Assignee: Firmenich SA, Geneva (CH)

( * ) Notice: Subject to any disclaimer, the term of this patent is extended or adjusted under 35 U.S.C. 154(b) by 0 days.

(21) Appl. No.: 10/870,915

(22) Filed: Jun. 21, 2004

(65) Prior Publication Data
US 2004/0242453 A1 Dec. 2, 2004

Related U.S. Application Data

(63) Continuation of application No. PCT/IB03/00111, filed on Jan. 15, 2003.

(30) Foreign Application Priority Data
Jan. 22, 2003 (WO) .................. PCT/IB02/00174

(51) Int. Cl.
*A61K 7/46* (2006.01)
(52) U.S. Cl. .................. 512/25; 426/534; 568/579; 568/531; 568/594; 568/596; 568/671; 568/672; 568/673
(58) Field of Classification Search .............. 512/25; 426/534; 568/579, 591, 594, 596, 671, 672, 568/673
See application file for complete search history.

(56) References Cited

U.S. PATENT DOCUMENTS 5,180,710 A 1/1993 Naef et al. ............ 512/26

2002/0193282 A1 12/2002 Naef et al. ............ 512/26

FOREIGN PATENT DOCUMENTS

EP 0 482 385 A1 4/1992
WO WO 01/58282 A1 8/2001

OTHER PUBLICATIONS

S. Arctander et al. XP002236540 "Perfume and Flavor Chemicals" S. Arctander, Montclair, N.J. (U.S.A) compound nos. 834, 835 and 2340 (1969).

*Primary Examiner*—Monique T. Cole
(74) *Attorney, Agent, or Firm*—Winston & Strawn LLP

(57) ABSTRACT

The present invention relates to an acetal of formula

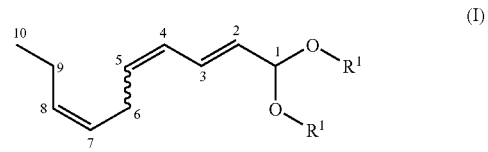

(I)

in which the symbols $R^1$ represent, independently or simultaneously, a linear or branched saturated or unsaturated $C_1$ to $C_4$ hydrocarbon group; or the two $R^1$ are bonded together to form a saturated ring having 5 to 7 atoms and including the oxygen atoms to which the $R^1$ groups are bonded, this ring being possibly substituted by methyl or ethyl groups; and the wavy line indicates that the double bond in position 4 has a configuration of the type (Z) or (E) or a mixture of the two configurations. The invention relates also to the use of such compounds as perfuming or flavoring ingredients, as well as the perfumed or flavored articles or perfuming or flavoring compositions containing such compounds.

10 Claims, No Drawings

ACETALS OF 2,4,7-DECATRIENAL AS PERFUMING OR FLAVORING INGREDIENTS

CROSS-REFERENCE TO RELATED APPLICATIONS

This application is a continuation of International application PCT/IB03/00111 filed Jan. 15, 2003, the entire content of which is expressly incorporated herein by reference thereto.

TECHNICAL FIELD

The present invention relates to the perfume or flavor industry. It concerns more particularly a compound of formula

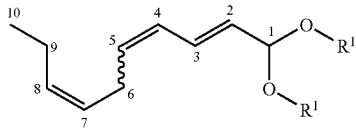

(I)

in which the symbols $R^1$ represent, independently or simultaneously, a linear or branched saturated or unsaturated $C_1$ to $C_4$ hydrocarbon group; or the two $R^1$ are bonded together to form a saturated ring having 5 to 7 atoms and including the oxygen atoms to which said $R^1$ groups are bonded, this ring being possibly substituted by methyl or ethyl groups; and the wavy line indicates that the double bond in position 4 has a configuration of the type (Z) or (E) or a mixture of the two configurations.

The invention relates also to the use of such a compound as a perfuming or flavoring ingredient, as well as the perfumed or flavored articles or perfuming or flavoring compositions containing a compound according to the invention.

BACKGROUND

To the best of our knowledge, none of the compounds of formula (I) is known.

SUMMARY OF THE INVENTION

Surprisingly, we have now established that the compounds of formula

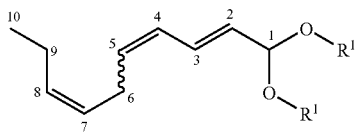

(I)

in which the symbols $R^1$ represent, independently or simultaneously, a linear or branched saturated or unsaturated $C_1$ to $C_4$ hydrocarbon group; or the two $R^1$ are bonded together to form a saturated ring having 5 to 7 atoms and including the oxygen atoms to which said $R^1$ groups are bonded, this ring being possibly substituted by methyl or ethyl groups; and the wavy line indicates that the double bond in position 4 has a configuration of the type (Z) or (E) or a mixture of the two configurations, possess useful and appreciated odorant or flavoring properties, which render them very convenient as perfuming or flavoring ingredient, e.g. for the preparation of perfuming or flavoring compositions as well as perfumed or flavored articles. The uses related to perfumery represent the preferred mode of realization of the present invention.

DETAILED DESCRIPTION OF THE PREFERRED EMBODIMENTS

Among the compounds of formula (I), the dimethyl acetal, wherein $R^1$ represents simultaneously methyl, i.e. namely (2E,4Z,7Z)-1,1-dimethoxy-2,4,7-decatriene, (2E,4E,7Z)-1,1-dimethoxy-2,4,7-decatriene or any mixture thereof, is very much appreciated as perfuming or flavoring ingredient for its excellent green note. This compound is the preferred of the invention.

The dimethyl acetal of the invention develops an odor with a pleasant and natural green note and more precisely having a violet leaves connotation associated with pear, vegetable, green bean, green balsamic notes, and a nice green tea under-note. The overall fragrance is somehow reminiscent of the odor of trans-2-hexenal and that of hazelnut.

Moreover, the odor of this compound is also highly persistent, which is quite rare for this family of green notes.

The flavor of the invention's dimethyl acetal has green-herbal and fruity notes, reminiscent of fresh cut grass or of the taste of (Z)-3-hexen-1-ol, together with nice tea and aldehydic notes, which make said compound particularly useful to confer a taste of the green-tea type.

Another example of invention's compounds is the diethyl acetal, wherein $R^1$ represents simultaneously ethyl, i.e. namely (2E,4Z,7Z)-1,1-diethoxy-2,4,7-decatriene, (2E,4E,7Z)-1,1-diethoxy-2,4,7-decatriene or any mixture thereof. Said compound possesses an odor which is more vegetable, violet leaves and less fruity than the odor of the dimethyl analogue mentioned above.

As the above-mentioned compounds are useful ingredients for the perfuming or the flavoring of various products, the present invention concerns also all different forms of the invention's compounds which can be advantageously employed in perfumery or in flavors. Such forms include a composition of matter consisting of a compound of formula (I) and a solvent commonly used in perfumery or in flavors. As examples of said solvents used in perfumery, one can cite compounds such as dipropyleneglycol, diethyl phthalate, isopropyl myristate, benzyl benzoate, 2-(2-ethoxyethoxy)-1-ethanol or ethyl citrate, which are the most commonly used. As examples of solvents commonly used in flavors one can cite compounds such as propylene glycol, triacetine, triethyl citrate, benzylic alcohol, benzyl benzoate, ethanol, vegetal oils or terpenes.

Additionally, the present invention concerns a perfuming composition comprising at least one compound of formula (I). Generally speaking, by "perfuming composition" we mean here a mixture comprising at least two perfuming ingredients, in any of their forms, and possibly one or more solvents commonly used in perfuming compositions. Therefore, a perfuming composition according to the invention comprises at least one invention's compound together with one or more perfuming co-ingredients and possibly one or more solvents.

The nature and type of these perfuming co-ingredients do not warrant a more detailed description here, which in any case would not be exhaustive, the skilled person being able to select them on the basis of its general knowledge and according to the nature of the product to be perfumed and the desired olfactory effect. In general terms, these perfuming co-ingredients belong to chemical classes as varied as alcohols, aldehydes, ketones, esters, ethers, acetates, nitriles, terpene hydrocarbons, nitrogenous or sulphurous heterocyclic compounds and essential oils of natural or synthetic origin. Many of these ingredients are in any case listed in reference texts such as the book by S. Arctander, Perfume and Flavor Chemicals, 1969, Montclair, N.J., USA, or its more recent versions, or in other works of a similar nature, as well as in the abundant patent literature in the field of perfumery.

Similarly, a detailed description of the nature and type of solvents commonly used in perfuming compositions cannot be exhaustive. A skilled person in the art is able to select them on the basis of the nature of the product to be perfumed. However, as non-limiting examples of such solvents, one can cite, in addition to the solvents mentioned above, also ethanol, water/ethanol mixtures, limonene or other terpenes, isoparaffins such as those known under the trademark ISOPAR® (origin: Exxon Chemical) or glycol ethers and glycol ether esters such as those known under the trademark DOWANOL® (origin: Dow Chemical Company).

Its is also understood that, unless otherwise indicated or described, any composition resulting from a chemical synthesis in which the compound of the invention is involved as a starting intermediate or as an end-product is not a perfuming composition according to the invention.

The perfuming compositions according to the invention may be in the form of a simple mixture of the various co-ingredients and solvents, or also in the form of a biphasic system such as an emulsion or microemulsion. Such systems are well known to a person skilled in the art.

As previously mentioned, a compound of formula (I), in any of its forms, or a perfuming composition comprising said compound of formula (I), is a useful perfuming ingredient which can be advantageously used in all the fields of modern perfumery such as fine perfumery or functional perfumery. Consequently, the use of an invention's compound, in any of its forms, as perfuming ingredient is another object of the present invention. Moreover, perfumed articles comprising at least one invention's compound, in any of its forms, or comprising a perfuming composition comprising said compound of formula (I), are also an object of the present invention.

Suitable perfumed articles comprise solid or liquid detergents and fabric softeners as well as all the other articles common in perfumery, namely perfumes, colognes or aftershave lotions, perfumed soaps, shower or bath salts, mousses, oils or gels, hygiene products or hair care products such as shampoos, body-care products, deodorants or antiperspirants, air fresheners and also cosmetic preparations. As detergents are intended applications such as detergent compositions or cleaning products for washing up or for cleaning various surfaces, e.g. intended for textile, dish or hard-surface treatment, whether they are intended for domestic or industrial use. Other perfumed articles are fabric refreshers, ironing waters, papers, wipes or bleaches.

Some of the above-mentioned articles may represent an aggressive medium for the invention's compounds, so that it may be necessary to protect the latter from premature degradation, for example by encapsulation.

For the sake of clarity, it has to be mentioned that, by "perfumed article" we mean here a finished consumer product, or a part of said consumer product, capable of exerting a perfuming action. Therefore, a perfumed article according to the invention comprises at least a part of the whole formulation corresponding to the desired article, e.g. a detergent, and at least an invention's compound possibly together with one or more perfuming co-ingredients and possibly one or more solvents.

The nature and type of the constituents of the article do not warrant a more detailed description here, which in any case would not be exhaustive, the skilled person being able to select them on the basis of its general knowledge and according to the nature and the desired effect of said article.

The proportions in which the compounds according to the invention can be incorporated into the various aforementioned articles or compositions vary within a wide range of values. These values are dependent on the nature of the article or product to be perfumed and on the desired olfactory effect as well as the nature of the co-ingredients in a given composition when the compounds according to the invention are mixed with perfuming co-ingredients, solvents or additives commonly used in the art.

For example, typical concentrations from 0.1% to 1.0%, and preferably from 0.3% to 0.8%, by weight of these compounds, with respect to the perfuming composition in which they are incorporated, can be typically used. Lower concentrations than these can be used when these compounds are directly applied for perfuming some of the consumer products mentioned above.

Furthermore, the compounds of the invention, in any of its forms, can also be incorporated into flavoring compositions or flavored articles, together with current co-ingredient or adjuvant, e.g. to impart taste to flavoring compositions, foods or beverages. Consequently, the use of an invention's compound, in any of its forms, as flavoring ingredient is another object of the present invention, as well as a flavoring composition comprising said compound of formula (I), and a flavored article comprising at least one invention's compound, in any of its forms, or comprising a flavoring composition comprising said compound are also an object of the present invention.

For the sake of clarity, by flavoring compositions or flavored articles we mean here compositions or articles as defined above and wherein the term perfuming is replaced by flavoring. Examples of flavoring co-ingredients are listed in reference texts such as the above-mentioned book by S. Arctander, as well as in the abundant patent literature in the field of flavors. The skilled person in the art of flavors is able to select them on the basis of its general knowledge and according to the nature of the product to be flavored and the desired taste. Examples of solvents commonly used in the flavor industry are the same as listed above.

As previously, its is also understood that any composition resulting from a chemical synthesis in which the compound of the invention is involved as a starting intermediate or as an end-product is not a flavoring composition according to the invention.

The flavoring compositions according to the invention may be in the form of a simple mixture of flavoring ingredients or also in an encapsulated form, i.e. a flavoring composition entrapped into a solid matrix which may comprise wall-forming and plasticizing materials such as mono-, di- or trisaccharides, natural or modified starches, hydrocolloids, cellulose derivatives, polyvinyl acetates, polyvinylalcohols, proteins or pectins. Example of particularly useful matrix materials include sucrose, glucose, lactose, levulose, fructose, maltose, ribose, dextrose, isomalt, sorbitol, mannitol, xylitol, lactitol, maltitol, pentatol, arabinose, pentose, xylose, galactose, maltodextrin, dextrin, chemically modified starch, hydrogenated starch hydrolysate, succinylated or hydrolysed starch, agar, carrageenan, gum arabic, gum accacia, tragacanth, alginates, methyl cellulose, carboxymethyl cellulose, hydroxyethyl cellulose, hydroxypropylmethyl cellulose, derivatives, gelatin, agar, alginate and mixtures thereof. Other suitable carrier ingredients are cited in reference texts such as H. Scherz, Hydrokolloids: stabilisatoren, Dickungsund Gehermittel in Lebensmittel, Band 2 der Schriftenreihe Lebensmittelchemie, Lebensmittelqualität, Behr's VerlagGmbH & Co., Hamburg, 1996 Said encapsulation is well known to a person skilled in the art, and may be performed, for instance, using techniques such as spray-drying, agglomeration or yet extrusion; or consist of a coating encapsulation, including coacervation and complex coacervation techniques.

Suitable flavored articles comprise any beverage and, in particular, the compounds of formula (I) may be incorporated into tea-beverages to provide an improved green-tea flavor.

When these compounds are used for these compositions or articles, useful flavor effects can be obtained using concentrations of the order of 0.1 to 1000 ppm, more preferably in the order of 0.1 to 50 ppm, with respect to the product into which they are incorporated. Much higher concentrations can be chosen when the compounds are used in concentrated flavors or flavoring compositions intended to be incorporated in consumer products.

The compounds of the invention thus make it possible to confer, improve, enhance or modify the odor or taste of a consumer product, as well as of perfuming bases or concentrates, or yet flavor preparations and compositions.

In addition to their useful organoleptic properties, the compounds of the invention can also be used as valuable intermediates for the synthesis of the corresponding aldehydes, namely (2E,4Z,7Z)-2,4,7-decatrienal, (2E,4E,7Z)-2,4,7-decatrienal or mixture thereof, which are known perfuming or flavoring ingredients (see WO 01/58282, to Firmenich). According to the present invention, a process for the preparation of (2E,4Z,7Z)-2,4,7-decatrienal, (2E,4E,7Z)-2,4,7-decatrienal or mixtures thereof, is characterized in that a compound according to formula (I) is treated with a protic acid. As acid may be used a compound such as an organic sulfonic or carboxylic acid or a strong mineral acid or even silica or silic acid. Examples of said acids are the para-toluene sulfonic acid, silica gel or a cross-linked polystyrene functionalized with sulfonic acid, such as those known under the trademark AMBERLITE® (origin: Fluka, Switzerland). The acid may be used in catalytic amounts, such as 0.01 to 0.2 molar equivalents of acidic protons in respect to the moles of acetal of formula (I), but it is understood that higher amounts can also be used.

EXAMPLES

The invention will now be described in further detail by way of the following examples, wherein the abbreviations have the usual meaning in the art, the temperatures are indicated in degrees centigrade (° C.); the NMR spectral data were recorded in $CDCl_3$ (if not stated otherwise) with a 360 or 400 MHz machine for $^1H$ and 90 MHz for $^{13}C$, the chemical displacement δ are indicated in ppm with respect to the TMS as standard, the coupling constants J are expressed in Hz.

Example 1

Synthesis of (2E,7Z)-,1-dimethoxy-2,4,7-decatriene

The (Z)-3-hexenyltriphenylphosphonium bromide and the (E)-4,4-dimethoxy-2-butenal were prepared as described in the literature by B. Maurer et al. in Helv.Chim.Acta, 65, 462, (1982) or by G. M. Coppola in Synthesis, 1021, (1984), respectively. To a suspension of 55.2 g of (Z)-3-hexenyltriphenylphosphonium bromide (0.13 mol) in 300 ml of dry diethyl ether, at 15–20° C. and under a good stirring, were added, dropwise, 78 ml of a 1.8 M solution of n-butyllithium in hexane (0.125 mol). After 1 hour of stirring at room temperature, it was added dropwise to the reaction medium, maintaining the reaction temperature between −30° and −35° C., a solution of 16.8 g of (E)-4,4-dimethoxy-2-butenal (purity: 76%, 0.1 mol) in 100 ml of dry ether. The reaction was allowed to warm-up at room temperature and stirred during 3 hours. Afterwards, the reaction mixture was poured into an ice cold saturated solution of $NH_4C_1$ and the aqueous phase was twice extracted with 200 ml of ether. The combined organic phases were washed with 100 ml of HCl 1N, 100 ml of saturated $NaHCO_3$, 100 ml of water and finally with 100 ml of brine. The organic phases thus obtained were dried over $MgSO_4$ and concentrated to yield 29 g of crude product. Said crude product was then suspended into 200 ml of pentane and after 2 hours at 0° C. the suspended material was removed by filtration. The thus obtained pentane solution was concentrated to yield 23 g of extract which has been further purified by distillation over a Vigreux column (55–62° C./0.1 mbar) to yield 15.3 g of a mixture containing 88% of (2E,4Z,7Z)-1,1-dimethoxy-2,4,7-decatriene and 8% of (2E,4E,7Z)-1,1-dimethoxy-2,4,7,-decatriene (yield=78%).

(2E, 4Z, 7Z)-1,1-dimethoxy-2,4,7-decatriene $^1$H-NMR: 0.98 (t, J=7 Hz, 3H); 2.08 (d×q, J=7, 7 Hz, 2H); 2.95 (d×d, J=7, 7 Hz, 2H); 3.33 (s, 6H); 4.87 (d, J=5 Hz, 1H); 5.31 (d×t, J=7, 11 Hz, 1H); 5.42 (d×t, J=7, 11 Hz, 1H); 5.48 (d×t, J=7, 10 Hz, 1H); 5.61 (d×d, J=5, 16 Hz, 1H); 6.01 (d×d, J=10, 10 Hz, 1H); 6.67 (d×d, J=10, 16 Hz, 1H).

$^{13}$C-NMR: 14.2(q); 20.6(t); 26.1(t); 52.6(q); 102.7(d); 126.4(d); 127.4(d); 128.7(d); 129.2(d); 132.3(d); 132.5(d).

MS: 196($M^+$,1), 181(2), 165(39), 153(8), 149(4), 135(30), 127(59), 117(26), 105(38), 91(100), 79(85), 75(77), 71(58), 55(44), 45(69), 41(74), 29(25).

(2E,4E,7Z)-1,1-dimethoxy-2,4,7-decatriene $^1$H-NMR: 0.96 (t, J=7 Hz, 3H); 2.05 (d×q, J=7, 7 Hz, 2H); 2.83 (d×d, J=7, 7 Hz, 2H); 3.31 (s, 6H); 4.81 (d, J=5 Hz, 1H); 5.34 (d×t, J=7, 10 Hz, 1H); 5.46 (d×t, J=7, 10 Hz, 1H); 5.52 (d×d, J=5, 16 Hz, 1H); 5.74 (d×7, J=7, 15 Hz, 1H); 6.07 (d×d, J=10, 15 Hz, 1H); 6.32 (d×d, J=10, 16 Hz, 1H).

$^{13}$C-NMR: 14.2(q); 20.5(t); 30.3(t); 52.6(q); 102.8(d); 125.7(d); 127.0(d); 129.2(d); 133.0(d); 133.9(d); 134.9(d).

MS: 196($M^+$,18), 181(8), 165(67), 153(19), 149(5), 133 (19), 127(100), 105(27), 91(65), 79(60), 75(32), 71(32), 55(19), 45(33), 41(31), 29(8)

Mixtures of (2E,4Z,7Z)-1,1-dimethoxy-2,4,7-decatriene and (2E,4E,7Z)-1,1-dimethoxy-2,4,7-decatriene containing different proportions of the 4Z and 4E isomers can be obtained by changing the above mentioned conditions according to the general knowledge of the art.

Example 2

Synthesis of (2E,7Z)-2,4,7-decatrienal

To a solution of 9.8 g of a mixture of (2E,7Z)-1,1-dimethoxy-2,4,7-decatriene as obtained in example 1 (50 mmoles) and 2.7 ml of water (150 mmoles) in 150 ml of acetone were added 0.2 g of AMBERLITE®, and the reaction mixture so obtained was stirred for 1 hour at room temperature. Afterwards, the reaction mixture was filtered and neutralized with 1 ml of a saturated aqueous solution of NaHCO$_3$, and then concentrated. The crude product thus obtained was dissolved in Et$_2$O and the organic phase has been washed twice with brine, dried over Na$_2$SO$_4$ and concentrated to yield 8.8 g of an extract. The extract has been further purified by distillation over a Vigreux column (52–54° C./0.1 mbar) to yield 7.2 g of a mixture of (2E,7Z)-2,4,7-decatrienal (4Z:4E=88:8)(purity=96%, yield=96%). The product thus obtained had the same spectroscopic data as described in WO 01/58282.

Example 3

Synthesis of (2E,7Z)-1,1-diethoxy-2,4,7-decatriene

A hot solution of ammonium nitrate (0.3 g) in ethanol (15 ml) was added to a mixture of 2,4,7-decatrienal (6 g; 40 mmoles; mixture of isomers (2E,4Z,7Z) 62% and (2E,4E,7Z 38%) and ethyl orthoformate (8.9 g; 60 mmoles) stirred at 20°. Stirring was continued during the night, the color changed from light yellow to dark brown. The reaction mixture was twice extracted with ethyl acetate, washed with a saturated solution of sodium bicarbonate and twice with brine. The organic phases were dried on magnesium sulphate and concentrated under vacuum giving 11.3 g of crude acetal. Distillation with a Vigreux column at 0.1 mbar/61°14 64° gave the desired product, with a purity of 96%, and in the form of a mixture containing 49% of the isomer (2E,4Z,7Z) and 51% of the isomers (2E,4E,7Z).

(2E,4Z,7Z)-decatrienal diethyl acetal $^1$H-NMR: 0.96 (t, J=7 Hz, 3H); 1.22 (t, J=7 Hz, 6H); 2.08 (dxq, J=7, 7 Hz (dxd, J=7, 7 Hz, 2H); 3.57 (q, J=7 Hz, 4H); 4.97 (d, J=5 Hz, 1H); 5.32 (dxt, J=7, 11 Hz, 1H); 5.42 (dxt, J=7, 11 Hz, 1H); 5.46 (dxt, J=7, 10 Hz, 1H); 5.67 (dxd, J=5, 16 Hz, 1H); 6.01 (dxd, J=10, 10 Hz, 1H); 6.65 (dxd, J=10, 16 Hz, 1H).

$^{13}$C-NMR: 14.2(q); 15.3(q); 20.6(t); 26.1(t); 61.0(t); 101.3(d); 126.4(d); 127.5(d); 128.1(d); 130.2(d); 132.0(d); 132.5(d).

MS : 224(M$^+$,2), 195(6), 179(92), 155(42), 149(26), 133 (16), 121(44), 107(80), 91(65), 79(100), 67(43), 55(47), 41(35), 29(35).

(2E,4E,7Z)-decatrienal diethyl acetal $^{13}$H-NMR: 0.96 (t, J=7 Hz, 3H); 1.21 (t, J=7 Hz, 6H); 2.08 (dxq, J=7, 7 Hz 2H); 2.83 (dxd, J=7, 7 Hz, 2H); 3.57 (q, J=7 Hz, 4H); 4.91 (d, J=5 Hz, 1H); 5.34 (dxt, J=7, 10 Hz, 1H); 5.46 (dxt, J=7, 10 Hz, 1H); 5.57 (dxd, J=5, 16 Hz, 1H); 5.74 (dxt, J=7, 15 Hz, 1H); 6.07 (dxd, J=10, 15 Hz, 1H); 6.31 (dxd, J=10, 16 Hz, 1H).

$^{13}$C-NMR: 14.2(q); 15.3 (q); 20.5(t); 30.3(t); 60.9 (t); 101.3(d); 125.7(d); 128.0(d); 129.3(d); 133.0(d); 133.2 (d); 134.6(d).

MS: 224 (M$^+$,9), 195(11), 179(100), 155(80), 149(27), 133(16), 121(45), 107(82), 91(67), 79(95), 67(43), 55(45), 41(31), 29(32).

Example 4

A "quince" type accord was prepared by admixing the following ingredients:

| Ingredient | Parts by weight |
| --- | --- |
| 10%* Amyl acetate | 10 |
| 10%* Ethyl acetate | 20 |
| 10%* Hexyl acetate | 30 |
| Benzyl acetate | 10 |
| 10%* Cis-3-hexenyl acetate | 40 |
| 10%* Amyl alcohol | 10 |
| Ethyl hexanoate | 90 |
| Ethyl decanoate | 70 |
| Etaspirene[1] | 15 |
| Farnesene | 1280 |
| 10%* Gamma hexalactone | 20 |
| 10%* Ethyl isobutyrate | 30 |
| HEDIONE ® HC[2] | 20 |
| Ethyl laurate | 50 |
| 10%* Ethyl-2-methylbutyrate | 25 |
| 1%* Gamma octalactone | 40 |
| Ethyl octylate | 170 |
| Ethyl heptanoate | 5 |
| 10%* Ethyl nonanoate | 30 |
| β-Ionone | 10 |
| Diethyl 1,4-cyclohexanedicarboxylate[3] | 25 |
| | 2000 |

*in dipropyleneglycol
[1](+−)-6-ethyl-2,10,10-trimethyl-1-oxaspiro[4.5]deca-3,6-diene; origin: Firmenich SA, Geneva, Switzerland
[2]methyl dihydrojasmonate; origin : Firmenich SA, Geneva, Switzerland
[3]origin: Firmenich SA, Geneva, Switzerland The addition to this base composition of 200 parts by weight of the dimethyl acetal according to the invention imparted to said composition a very natural green note, developing the violet-powdery note and enhancing the fruity pear, quince connotation.

Example 5

An "apple" type base composition was prepared by admixing the following ingredients:

| Ingredient | Parts by weight |
| --- | --- |
| 10%* Cis-3-hexenol acetate | 20 |
| Verdyl acetate | 20 |
| Ethyl 3-oxobutanoate | 80 |
| 1-Hexanol | 10 |
| 2-Phenyl-1-propanol | 40 |
| 10%* Acetaldehyde | 80 |
| Benzyl benzoate | 200 |
| 10%* α-Damascone[1] | 100 |
| HELVETOLIDE ®[2] | 80 |
| (E)-2-Diethoxymethyl-1-phenyl-1-heptene | 40 |
| Ethyl malonate | 40 |
| 1%* DYNASCONE ®[3] | 30 |
| Nerol | 40 |
| Phenethylol | 100 |
| 6,10-Dimethyl-5,9-undecadien-2-one | 120 |
| Terpineol | 40 |
| Triplal[4] | 10 |

-continued

| Ingredient | Parts by weight |
|---|---|
| Vert de Lilas | 20 |
| 10%* Vertonal | 100 |
| | 1170 |

*in dipropyleneglycol
[1])1-(2,6,6-trimethyl-2-cyclohexen-1-yl)-2-buten-1-one; origin: Firmenich SA, Geneva, Switzerland
[2])(+)-(1S,1'R)-2-[1-(3',3'-dimethyl-1'-cyclohexyl)ethoxy]-2-methylpropyl propanoate; origin: Firmenich SA, Geneva, Switzerland
[3])1-(5,5-dimethyl-1-cyclohexen-1-yl)-4-penten-1-one; origin: Firmenich SA, Geneva, Switzerland
[4])origin: WF, USA The addition of 30 parts by weight of the dimethyl acetal according to the invention to the above-described composition imparted to the latter a more pronounced green-apple connotation, with a slightly pear, cereal character. Moreover, this note was particularly persistent, as it was still perceivable after 48 hours, which is quite exceptional for such a fresh green note.

Example 6

A flavor (A) for a beverage of the tea type was prepared by admixing the following ingredients:

| Ingredient | Parts by weight |
|---|---|
| Cis jasmone | 5 |
| 10%* Indol | 20 |
| Linalool | 50 |
| Linalyl acetate | 10 |
| 1%** Isovalerianic aldehyde | 5 |
| α-Terpineol | 30 |
| Phenylacetic aldehyde | 2 |
| 10%* β-Damascone[1]) | 20 |
| 10%* β-Ionone | 5 |
| 20%* FURANEOL ®[2]) | 10 |
| 10%* Octanal | 5 |
| Methyl salicylate | 5 |
| Ethanol | 833 |
| | 1000 |

*in ethyl alcohol;
**in triacetine
[1])1-(2,6,6-trimethyl-1-cyclohexen-1-yl)-2-buten-1-one; origin: Firmenich SA, Geneva, Switzerland
[2])4-hydroxy-2,5-dimethyl-3(2H)-furanone; origin: Firmenich SA, Geneva, Switzerland To the above-described flavor (A) were added 20 parts by weight of the dimethyl acetal according to the invention to obtain a flavor (B) and then two tea beverages were prepared by using 50 ppm of the two flavors, i.e. (A) or (B). According to the flavorists, flavor (B), when compared with (A), imparted to the final beverage a sweet, green-deep effect quite appreciated.

What is claimed is:

1. A compound of formula

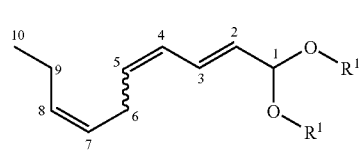

(I)

in which $R^1$ represents, independently or simultaneously, a linear or branched saturated or unsaturated $C_1$ to $C_4$ hydrocarbon group; or the two $R^1$ groups are bonded together to form a saturated ring having 5 to 7 atoms and including the oxygen atoms to which the $R^1$ groups are bonded, this ring optionally being substituted by methyl or ethyl groups; and the wavy line indicates that the double bond in position 4 has a configuration of the type (Z) or (E) or a mixture of those two configurations.

2. As a compound according to claim 1, (2E,4Z,7Z)-1,1-dimethoxy-2, 4,7-decatriene, (2E,4E,7Z)-1,1-dimethoxy-2,4,7-decatriene or any mixture thereof.

3. As a compound according to claim 1, (2E,4Z,7Z)-1,1-diethoxy-2, 4,7-decatriene, (2E,4E,7Z)-1,1-diethoxy-2,4,7-decatriene or any mixture thereof.

4. A composition of matter comprising a compound according to claim 1 and a solvent.

5. A composition of matter according to claim 4, further comprising a consumable material and a further solvent commonly used in perfumery or in flavors.

6. A perfuming composition or perfumed article comprising at least one compound of formula (I), as defined in claim 1.

7. A perfuming composition or perfumed article according to claim 6, comprising as a perfuming ingredient (2E,4Z,7Z)-1,1-dimethoxy-2,4,7-decatriene, (2E,4E,7Z)-1,1-dimethoxy-2,4,7-decatriene or any mixture thereof.

8. A perfuming composition or a perfumed article according to claim 6, in the form of a solid or liquid detergent, a fabric softener, a perfume, a cologne or after-shave lotion, a perfumed soap, a shower or bath salt, mousse, oil or gel, an hygiene product or hair care product, a shampoo, a body-care product, a deodorant or antiperspirant, an air freshener, a cosmetic preparation, a fabric refresher, an ironing water, papers, wipes or bleaches.

9. A flavoring composition or flavored article comprising at least one compound of formula (I), as defined in claim 1.

10. A method to confer, improve, enhance or modify the odor or taste of a consumer product, a perfuming base, a perfuming concentrate, or a flavor preparation or and compositions, which comprises adding thereto an odor or taste effective amount of a compound according to claim 1.

* * * * *

UNITED STATES PATENT AND TRADEMARK OFFICE
CERTIFICATE OF CORRECTION

PATENT NO. : 7,022,665 B2
DATED : April 4, 2006
INVENTOR(S) : Decorzant et al.

It is certified that error appears in the above-identified patent and that said Letters Patent is hereby corrected as shown below:

<u>Title page,</u>
Item [30], Foreign Application Priority Data, change "Jan. 22, 2003" to -- Jan. 22, 2002 --.

Signed and Sealed this

Thirtieth Day of May, 2006

JON W. DUDAS
*Director of the United States Patent and Trademark Office*